US011373287B2

(12) United States Patent
Bonneau et al.

(10) Patent No.: US 11,373,287 B2
(45) Date of Patent: Jun. 28, 2022

(54) DIGITAL QUALITY CONTROL USING COMPUTER VISIONING WITH DEEP LEARNING

(71) Applicant: Accenture Global Solutions Limited, Dublin (IE)

(72) Inventors: Olivier Bonneau, Paris (FR); Sami Hamani, Nogent (FR); Aloïs Peter Prieur De La Comble, Maisons-Alfort (FR); Patrick Cottereau, Saint Maurice (FR)

(73) Assignee: Accenture Global Solutions Limited, Dublin (IE)

(*) Notice: Subject to any disclaimer, the term of this patent is extended or adjusted under 35 U.S.C. 154(b) by 862 days.

(21) Appl. No.: 16/223,336

(22) Filed: Dec. 18, 2018

(65) Prior Publication Data

US 2020/0082522 A1 Mar. 12, 2020

(30) Foreign Application Priority Data

Sep. 6, 2018 (EP) .................................... 18193035

(51) Int. Cl.
*G06T 7/00* (2017.01)
*G01N 21/94* (2006.01)
(Continued)

(52) U.S. Cl.
CPC ........... *G06T 7/0004* (2013.01); *G01N 21/94* (2013.01); *G06K 9/6228* (2013.01); *G06N 3/04* (2013.01);
(Continued)

(58) Field of Classification Search
CPC ........... G06T 7/0004; G06T 7/62; G06T 7/90; G06T 2200/24; G06T 2207/20084;
(Continued)

(56) References Cited

U.S. PATENT DOCUMENTS 9,589,374 B1 3/2017 Gao et al.
10,019,654 B1 7/2018 Pisoni
(Continued)

FOREIGN PATENT DOCUMENTS

CA 2731229 7/2017
CA 3045333 6/2018
(Continued)

OTHER PUBLICATIONS

He et al. "Deep Residual Learning for Image Recognition", IEEE, 2015 (Year: 2015).*
(Continued)

*Primary Examiner* — Aaron W Carter
(74) *Attorney, Agent, or Firm* — Fish & Richardson P.C.

(57) ABSTRACT

Implementations include receiving sample data, the sample data being generated as digital data representative of a sample of the product, providing a set of features by processing the sample data through multiple layers of a residual network, a first layer of the residual network identifying one or more features of the sample data, and a second layer of the residual network receiving the one or more features of the first layer, and identifying one or more additional features, processing the set of features using a CNN to identify a set of regions, and at least one object in a region of the set of regions, and determine a type of the at least one object, and selectively issuing an alert at least partially based on the type of the at least one object, the alert indicating contamination within the sample of the product.

39 Claims, 4 Drawing Sheets

(51) Int. Cl.
  *G06K 9/62* (2022.01)
  *G06N 3/04* (2006.01)
  *G08B 21/18* (2006.01)
  *G06V 20/00* (2022.01)
  *G06T 7/62* (2017.01)
  *G06T 7/90* (2017.01)

(52) U.S. Cl.
  CPC ............ *G06V 20/00* (2022.01); *G08B 21/18* (2013.01); *G06T 7/62* (2017.01); *G06T 7/90* (2017.01); *G06T 2200/24* (2013.01); *G06T 2207/20084* (2013.01); *G06T 2207/30004* (2013.01); *G06T 2207/30128* (2013.01); *G06V 2201/06* (2022.01)

(58) Field of Classification Search
  CPC . G06T 2207/30004; G06T 2207/30128; G06T 2207/30024; G06T 7/0012; G01N 21/94; G06K 9/6228; G06K 9/6273; G06K 9/6256; G06K 9/6267; G06N 3/04; G06N 3/08; G06N 3/0454; G06V 20/00; G06V 2201/06; G06V 10/454; G06V 10/82; G06V 20/52; G06V 10/25; G08B 21/18
  See application file for complete search history.

(56) References Cited

U.S. PATENT DOCUMENTS

| | | | |
|---|---|---|---|
| 10,271,008 B2* | 4/2019 | Breternitz | H04N 7/0117 |
| 10,527,699 B1* | 1/2020 | Cheng | G06N 3/0454 |
| 2014/0219538 A1 | 8/2014 | Guthrie et al. | |
| 2015/0031119 A1 | 1/2015 | Pierquin | |
| 2016/0152940 A1 | 6/2016 | Colin et al. | |
| 2017/0037355 A1 | 2/2017 | Barlet et al. | |
| 2017/0137772 A1 | 5/2017 | Drazek et al. | |
| 2017/0252924 A1 | 9/2017 | Vijayanarasimhan et al. | |
| 2017/0345141 A1 | 11/2017 | Vivet et al. | |
| 2018/0039853 A1* | 2/2018 | Liu | G06V 10/462 |
| 2018/0260665 A1 | 3/2018 | Zhang et al. | |
| 2018/0114317 A1* | 4/2018 | Song | G06N 3/0454 |
| 2018/0365820 A1* | 12/2018 | Nipe | G06V 10/40 |
| 2020/0012838 A1* | 1/2020 | Sharma | G06K 9/6273 |
| 2020/0074589 A1* | 3/2020 | Stent | G06K 9/6274 |
| 2020/0082522 A1* | 3/2020 | Bonneau | G06T 7/0004 |
| 2020/0193635 A1* | 6/2020 | Su | G06T 7/73 |
| 2021/0012091 A1* | 1/2021 | Liu | G06V 40/45 |

FOREIGN PATENT DOCUMENTS

| | | |
|---|---|---|
| CN | 103154262 | 8/2016 |
| CN | 106780612 | 5/2017 |
| CN | 107358596 | 11/2017 |
| CN | 108090501 | 5/2018 |
| EP | 1621530 | 2/2006 |
| EP | 3196651 | 7/2017 |
| FR | 2793808 | 11/2000 |
| FR | 2793809 | 11/2000 |
| JP | 2014515128 | 6/2014 |
| JP | 2017018126 | 1/2017 |
| JP | 2018022484 | 2/2018 |
| JP | 2018033430 | 3/2018 |

OTHER PUBLICATIONS

In Office Action in Indian Appln. No. 201914000669, dated Dec. 31, 2020, 7 pages.
Wikipedia.org [online], "Residual Neural Network," Aug. 22, 2018, retrieved on Jan. 15, 2021, retrieved from URL<https://en.wikipedia.org/w/index.php?title=Residual_neural_network&oldid=856083993>, 4 pages.
European Search Report in European Application No. 18193035.5, dated Feb. 27, 2019, 10 pages.
Fleury et al., "Implementation of Regional-CNN and SSD Machine Learning Object Detection Architectures for the Real Time Analysis of Blood Borne Pathogens in Dark Field Microscopy," Mathematics & Computer Science, Artificial Intelligence & Robotics, Preprints, Jul. 6, 2018, 10 pages.
Joffe et al., "Vision-Guided Robotic Leaf Picking," ICRA 2018 Workshop on Robotic Vision and Action in Agriculture, Jun. 11, 2018, 6 pages.
Wenyuan et al., "Path R-CNN for Prostate Cancer Diagnosis and Gleason Grading of Histological Images," Transactions on Medical Imaging (Early Access), IEEE, Oct. 12, 2018, 1 page.
Zhihong et al., "A Vision-based Robotic Grasping System Using Deep Learning for Garbage Sorting", 2017.
SG Office Action in Singapore Appln. No. 10201900591S, dated May 5, 2020, 7 pages.
Tahir et al., "A Fungus Spores Dataset and a Convolutional Neural Network Based Approach for Fungus Detection," IEEE Transactions on Nanobioscience, Jul. 31, 2018, 17(3):281-290.
JP Office Action in Japanese Application No. 2019-013898, dated Mar. 11, 2020, 7 pages (with English translation).
Ren et al., "Faster R-CNN: Towards Real-Time Object Detection with Region Proposal Networks", arXiv: 1506.01497, Jan. 6, 2016, 14 pages.

* cited by examiner

DIGITAL QUALITY CONTROL USING COMPUTER VISIONING WITH DEEP LEARNING

CROSS-REFERENCE TO RELATED APPLICATION

This application claims priority to European Patent Application No. 18193035.5, filed on Sep. 6, 2018, entitled "Digital Quality Control Using Computer Visioning With Deep Learning," the entirety of which is hereby incorporated by reference.

BACKGROUND

Enterprises employ quality control processes to ensure quality of products, and/or services. Enterprises operating in various industries implement quality control processes. Example industries include, without limitation, pharmaceutical, biotechnology, vaccines, in vitro diagnostic, food, beverage, chemistry, and utilities. In the food industry, for example, quality control processes can be used to ensure contaminants (e.g., micro-biological) are not present (or at least below a threshold level) in distributed foods. Quality control processes, however, can be manually intensive, and suffer from inaccuracies. In some instances, levels of contaminants that may be unacceptable are not appropriately detected in the quality control process.

SUMMARY

Implementations of the present disclosure are generally directed to a quality control system using computer visioning, and deep learning. More particularly, implementations of the present disclosure are directed to an artificial intelligence (AI)-based computer visioning system that automatically, or semi-automatically executes an end-to-end quality control process.

In some implementations, actions include receiving sample data, the sample data being generated as digital data representative of a sample of the product, providing a set of features by processing the sample data through multiple layers of a residual network, a first layer of the residual network identifying one or more features of the sample data, and a second layer of the residual network receiving the one or more features of the first layer, and identifying one or more additional features, processing the set of features to identify a set of regions of the sample of the product, altering a resolution of the digital data representation of the sample of the product based on the identified set of regions, processing the set of features to identify at least one object in a region of the set of regions, and determine a type of the at least one object, and selectively issuing an alert at least partially based on the type of the at least one object, the alert indicating contamination within the sample of the product. Other implementations of this aspect include corresponding systems, apparatus, and computer programs, configured to perform the actions of the methods, encoded on computer storage devices.

These and other implementations can each optionally include one or more of the following features: the residual network is Resnet-101; the set of features is processed using a convolution neural network (CNN); the CNN is a region-based CNN (R-CNN); actions further include providing a visual depiction of the sample within a user interface, the visual depiction comprising one or more graphical overlays indicating objects identified in the sample; actions further include moving, using a robotic arm, a sample container containing the sample to a position relative to a camera, the camera generating the sample data; the position is located on a conveyor, which conveys the sample container to the camera for imaging of the sample within the sample container; an output is provided and includes a one-hot encoded vector representative of the at least one object within the sample, and a confidence level, the confidence score representing a degree of confidence that the at least one object is of the type classified; the sample data includes one or more digital images of the sample; the set of features is processed to identify the volume of the region, and/or the area of the region, and/or the color of the region; the product includes a biological material, and/or a pharmaceutical product, and/ or a food product; the identified region includes a moisture colony; and the identified object includes bacteria.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to a quality control system using computer visioning, and deep learning. More particularly, implementations of the present disclosure are directed to an artificial intelligence (AI)-based quality control platform with computer visioning, which automatically, or semi-automatically executes an end-to-end quality control process. In some implementations, actions include receiving sample data, the sample data being generated as digital data representative of a sample of the product, providing a set of features by processing the sample data through multiple layers of a residual network, a first layer of the residual network identifying one or more features of the sample data, and a second layer of the residual network receiving the one or more features of the first layer, and identifying one or more additional features, processing the set of features using a convolution neural network (CNN) to identify a set of regions, and at least one object in a region of the set of regions, and determine a type of the at least one object, and selectively issuing an alert at least partially based on the type of the at least one object, the alert indicating contamination within the sample of the product.

Figure 1:
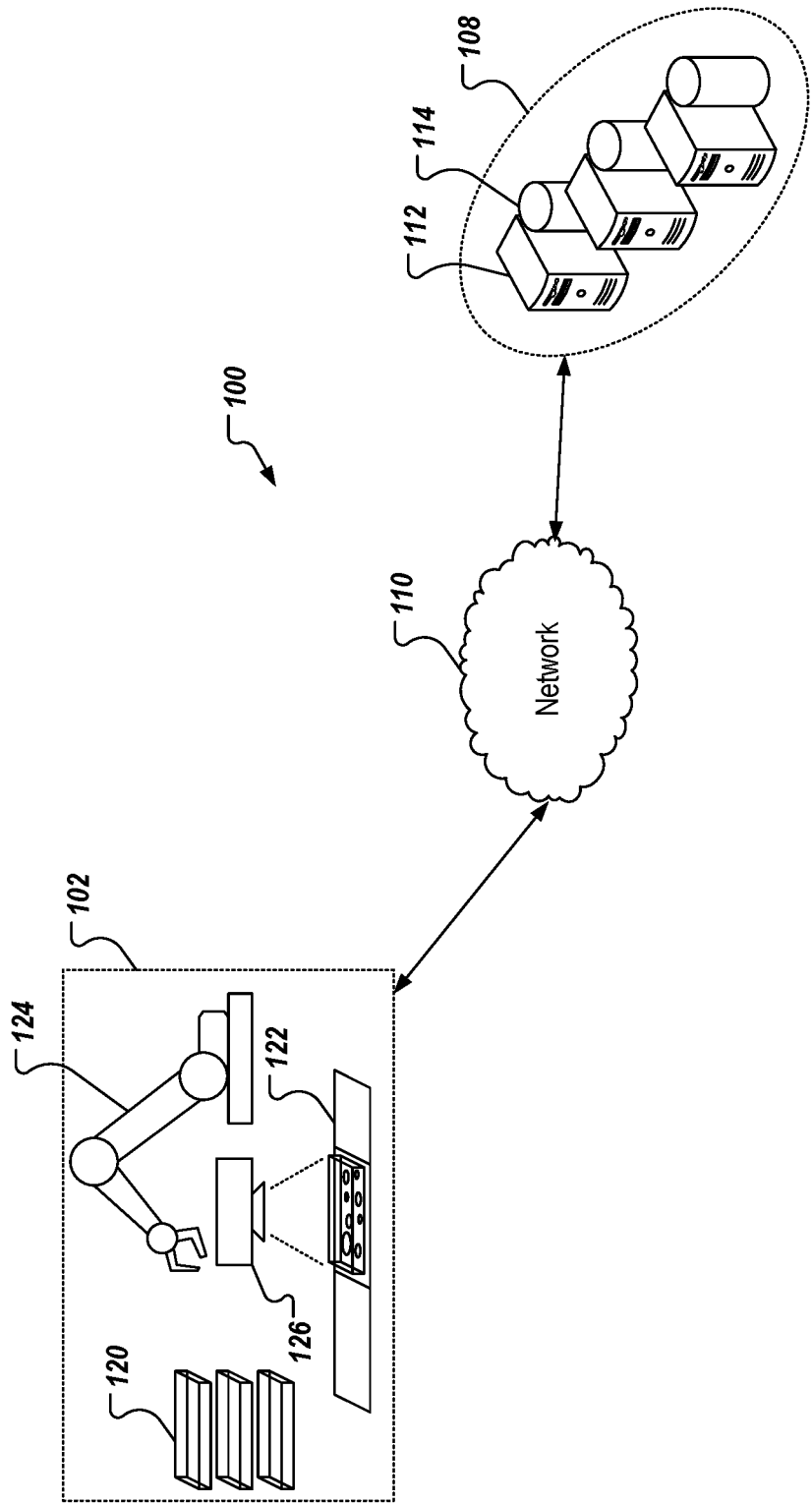
FIG. 1 depicts an example system that can execute implementations of the present disclosure.

FIG. 1 depicts an example system 100 that can execute implementations of the present disclosure. The example system 100 includes a data capture system 102, a back-end system 108, and a network 110. In some examples, the network 110 includes a local area network (LAN), wide area network (WAN), the Internet, or a combination thereof, and connects web sites, devices (e.g., components of the data capture system 102), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database). In some examples, the at least one server system 112 hosts one or more computer-implemented services that users can interact with using computing devices. For example, the server system 112 can host a computer-implemented quality control platform for automatically, or semi-automatically executes an end-to-end quality control process in accordance with implementations of the present disclosure.

In the depicted example, the data capture system 102 includes a set of sample containers 120, a conveyor belt 122, a robotic arm 124, and a camera 126. The sample containers 120 can include any appropriate container for containing a sample of an item that is to be analyzed for quality control (e.g., storage boxes, petri dishes). In some examples, the camera 126 can include any appropriate device for capturing digital images, and/or digital video. In some examples, the camera 126 is able to capture stereoscopic images. In some examples, the camera 126 is in a fixed position relative to the conveyor belt 122. In some examples, the camera 126 has freedom of movement relative to the conveyor belt 122. For example, the camera 126 can capture digital data from a first position, move, and capture digital data from a second position.

Although not depicted in FIG. 1, the example data capture system 102 can further include a computing device, and/or one or more lights. In some examples, the computing device coordinates activities among two or more components of the data capture system 102. In some examples, the computing device can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some examples, the one or more lights can light a sample within a sample container. In some examples, the one or more lights can include visible light, ultra-violet (UV) light, infra-red (IR) light. In some examples, the data capture system 102 can include additional cameras to have a multi angle views, or barcode scanners, interfaces to any appropriate information system to be able to send computed data, and/or a vertical laminar flow hood in order to work in sterile environment.

In some implementations, the back-end system 108 hosts an AI-based quality control platform in accordance with implementations of the present disclosure. In some examples, and as described in further detail herein, the AI-based quality control platform processes sample data using computer visioning, and AI to detect one or more objects within a sample, and determine a type of each object. In some examples, an object can include types of contamination (e.g. biological). In some examples, one or more types of contamination are provided. In some examples, if contamination is detected, the AI-based quality control system provides an alert. In some examples, if contamination is detected, and exceeds a threshold level, the AI-based quality control system provides an alert. In some examples, if an alert is generated, the sample that resulted in the alert can be moved to storage for subsequent analysis.

As described in further detail herein, the robotic arm 124 selectively sets sample containers 120 on, and takes sample containers 120 off the conveyor belt 122. In some examples, the sample containers 120 are provided as storage boxes, and/or petri dishes. In some implementations, after a sample container 120 is set on the conveyor belt 122, the conveyor belt 122 conveys the sample container 122 into position for imaging by the camera 126. The camera 126 captures digital image, and/or digital video. For example, the camera 126 can capture one or more digital images, and/or digital video of a sample contained within the sample container 120. In some examples, the digital images, and/or digital video record sample data in a sample file. In some examples, the sample file is transmitted to the AI-based quality control platform for processing, as described in further detail herein.

As described in further detail herein, AI-based quality control platform of the present disclosure enables accelerated, and increased reliability of identification, and quantity of types of contamination in quality control testing support. Further, after results of the analysis are determined, the AI-based quality control platform can send the results to any appropriate type of information system, or software (e.g., an enterprise resource planning (ERP) system)).

Implementations of the present disclosure are described in further detail herein with reference to a non-limiting, example context. The example context includes quality control of food. For example, samples of food items can be analyzed for contamination by the AI-based quality control platform of the present disclosure, and alerts can be selectively issued, as described herein. It is contemplated, however, that implementations of the present disclosure can be realized in any appropriate context (e.g., food, beverage, pharmaceutical, vaccines, biotechnology, chemistry, utilities industries).

Figure 2:
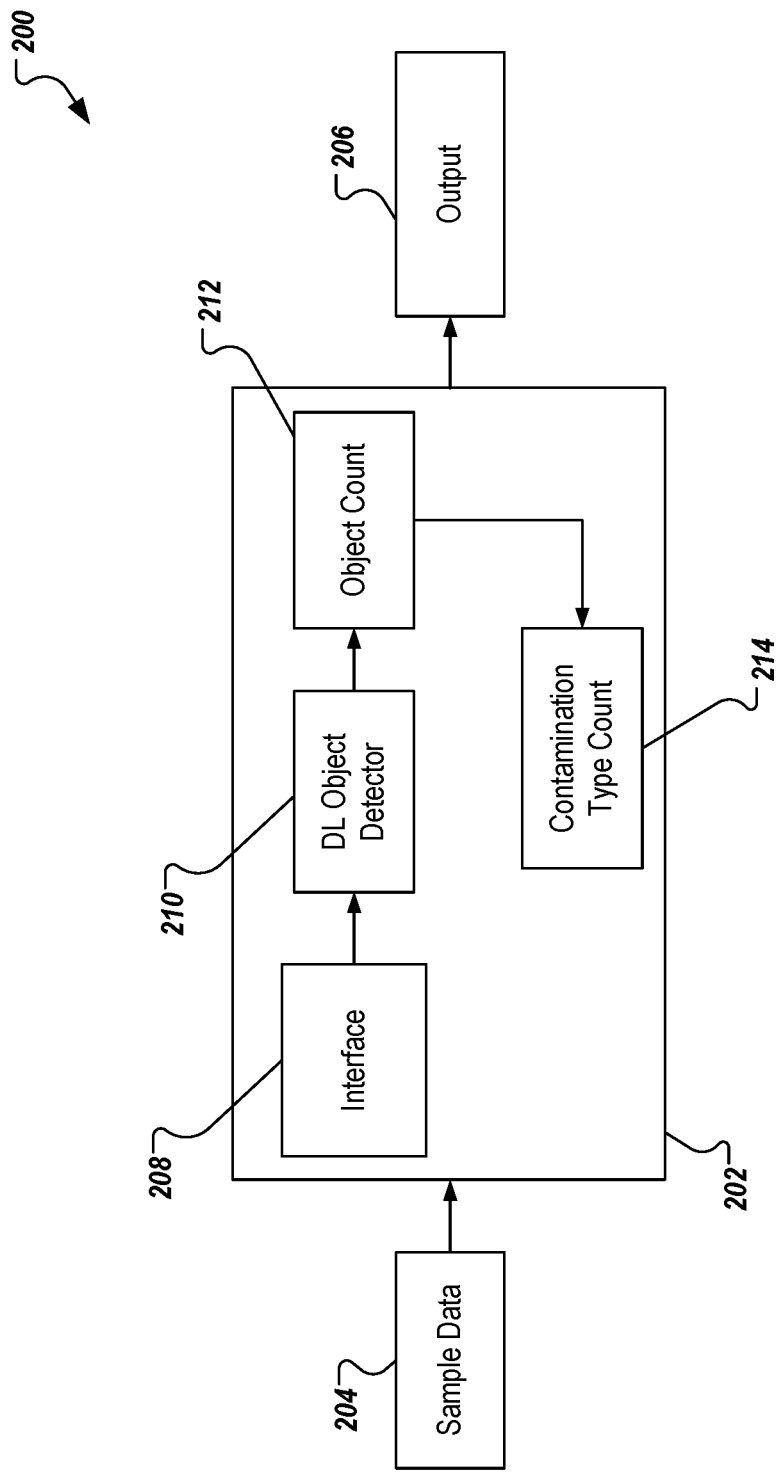
FIG. 2 depicts an example module architecture in accordance with implementations of the present disclosure.

FIG. 2 depicts an example module architecture 200 in accordance with implementations of the present disclosure. The example module architecture 200 includes an AI-based quality control platform 202. In accordance with implementations of the present disclosure, and as described in further detail herein, the AI-based quality control platform 202 receives sample data 204, and processes the sample data 204 to provide an output 206. In some examples, the sample data 204 includes digital images, and/or digital video (collectively, digital data) representative of a sample of an item (e.g., food). In some examples, the output 206 includes data representative of contamination, or lack thereof determined for the sample data 204. In some examples, the output 206 includes an alert.

In the example of FIG. 2, the AI-based quality control platform 202 includes an interface module 208, a deep learning (DL) object detector module 210, an object count module 212, and a contamination type count module 214. In some examples, the interface module 208 provides the sample data 204 to the DL object detector module 210. In some examples, the interface module 208 provides one or more user interfaces (UIs) that enables a user to interact with the AI-based quality control platform. For example, the interface module 208 can provide one or more UIs that a user can use to view results (e.g., graphical representations of the output 206), view the sample data 204 (e.g., digital data of samples being processed), and/or view alerts, if issued. In some examples, the one or more UIs are provided as part of a dashboard that provides real-time results, analytics, and/or alerts.

In accordance with implementations of the present disclosure, the sample data 204 is processed using one or more DL algorithms. For example, the DL object detector module 210 processes the sample data 204 through one or more DL algorithms to identify, qualify, and sort one or more types of contamination detected in the sample data 204. In some examples, the DL algorithms identify one or more features in the sample data 204. Example features include, without limitation, shape, dots, moisture, transparency, width, reflection, refraction, polarization, absorption, and photoluminescence. In some examples, the one or more features are identified in successive layers of abstraction. Example layers of abstraction can include, without limitation, basic features, local features, complex features, and global features. Based on the identified features, the AI-based quality control platform identifies one or more types of objects within the sample (e.g., microbiological contamination, moisture).

In some implementations, the DL of the present disclosure is implemented using a convolution neural network (CNN). An example CNN includes a regional-based CNN (R-CNN) implemented with a residual network (resnet) backbone. The R-CNN can be described as a CNN that identifies regions in images, within which an object may be located. An example resnet includes Resnet-101 (e.g., a residual network having 101 layers). It is contemplated, however, that implementations of the present disclosure can be realized using any appropriate neural network, and/or residual network.

In some implementations, the resnet is a feature extractor that processes the sample data 204 as normalized images. In some examples, a digital image can be processed to adjust a range of pixel intensity values, such that all pixel intensities lie within a predefined range of values, to provide a normalized image. In some examples, the digital image is normalized by zero-centering pixels. In some examples, centering is based on each channel (e.g., red, green, blue) mean intensity over a pretraining dataset. The mean per channel is then subtracted from each pixel's channel within the digital image.

In some implementations, processing of the sample data (image) through the resnet backbone is based on a pre-trained model. In some examples, the pre-trained model is trained for detection of features associated with objects that may be of interest (e.g., contaminants, moisture). In some examples, the pre-trained model is provided by a third-party. An example pre-trained model includes, without limitation, a Common Objects in Context (CoCo) model provided by Microsoft. In some examples, and in the context of the present disclosure, the pre-trained model is based on labeled images of samples that include objects (e.g., contaminants, moisture).

In some implementations, the image (e.g., RGB image format) that is being processed (e.g., the normalized image) progressively goes through the resnet backbone. At each layer, features within the image are identified, and refined. In further detail, the image is processed through a set of convolution layers of the resnet backbone, and is filtered at each layer to identify features. In some examples, features are identified based on contrast variations (e.g., left-to-right, horizontal-to-vertical). A next layer receives features identified in a previous layer for further processing, and identification of additional features, if any.

The resent outputs a set of features, which are input to the CNN. In some implementations, the CNN processes features in the set of features in a multi-step process. Example steps include providing a regional proposal, and classification. In some examples, the regional proposal includes a set of regions of interest (also referred to as a set of regions) determined through one or more layers of the CNN. In some examples, a region of interest includes an area of the sample that may contain an object. Example objects include, without limitation, contamination (e.g., (micro-) biological contamination), and moisture. In some implementations, regions of the set of regions are resized, and one or more layers of the CNN (e.g., a final layer) predicts a type of the object present. That is, one or more objects within each region is classified by type (e.g., contamination, or moisture).

In some implementations, if the number of objects detected within the sample is greater than a threshold number of objects, the sample data is adjusted, and reprocessed. In some examples, adjustment of the sample data includes adjusting a resolution. That is, a resolution of the image can be iteratively adjusted. In some examples, the image is split, and resolution is adjusted. In some examples, the image is split into multiple, overlapping parts (e.g., 4 overlapping parts). In some examples, each split width (resp. height) is $\frac{1}{2}+\frac{1}{8}=\frac{5}{8}$ of the full image width (resp. height). The overlap is here to make sure predictions are not hindered by lack of context (e.g., a biological colony is split in two). Non-maximum suppression is applied on predicted boxes. If a colony is found twice, only the most confident prediction is kept.

In some implementations, for each object, a confidence score, and a boundary localizing the object within the sample are provided. In some examples, the confidence score represents a degree of confidence that the object is indeed of the type classified. In some examples, the boundary is provided as a visual overlay on a digital image of the sample, which encloses all of, or at least a portion of the object. It is contemplated that the boundary can be any appropriate shape (e.g., square, rectangle, oval). In some examples, different boundaries for different objects can be provided. For example, a first boundary for contamination can be provided, and a second boundary for moisture can be provided, the first boundary being different than the second boundary.

In some implementations, an output of the AI processing includes one or more encoded vectors. In some examples, each vector corresponds to a type of object (e.g., microbiological colony) identified within the sample. In some examples, the encoded vectors are provided as one-hot encoded vectors. In some examples, the one-hot encoded vector can include a vector of types (categories) with 1's indicating that respective objects are of a particular type, and 0's indicating that respective objects are not of the particular type.

In some implementations, each vector is associated with a respective confidence score represents a degree of confidence that the object is indeed of the type classified. In some implementations, one or more confidence thresholds are provided, to which confidence scores can be compared. In some examples, if the confidence score exceeds a first threshold, there is high confidence that the prediction is accurate (e.g., green level). In some examples, if the confidence score exceeds a second threshold, but does not exceed the first threshold, there is lower confidence that the prediction is accurate (e.g., orange level). In some examples, if the confidence score does not exceed the second threshold, there is low confidence that the prediction is accurate (e.g., red level). In some examples, confidence levels (e.g., green, orange, red) can be visually depicted in a UI.

Figure 3:
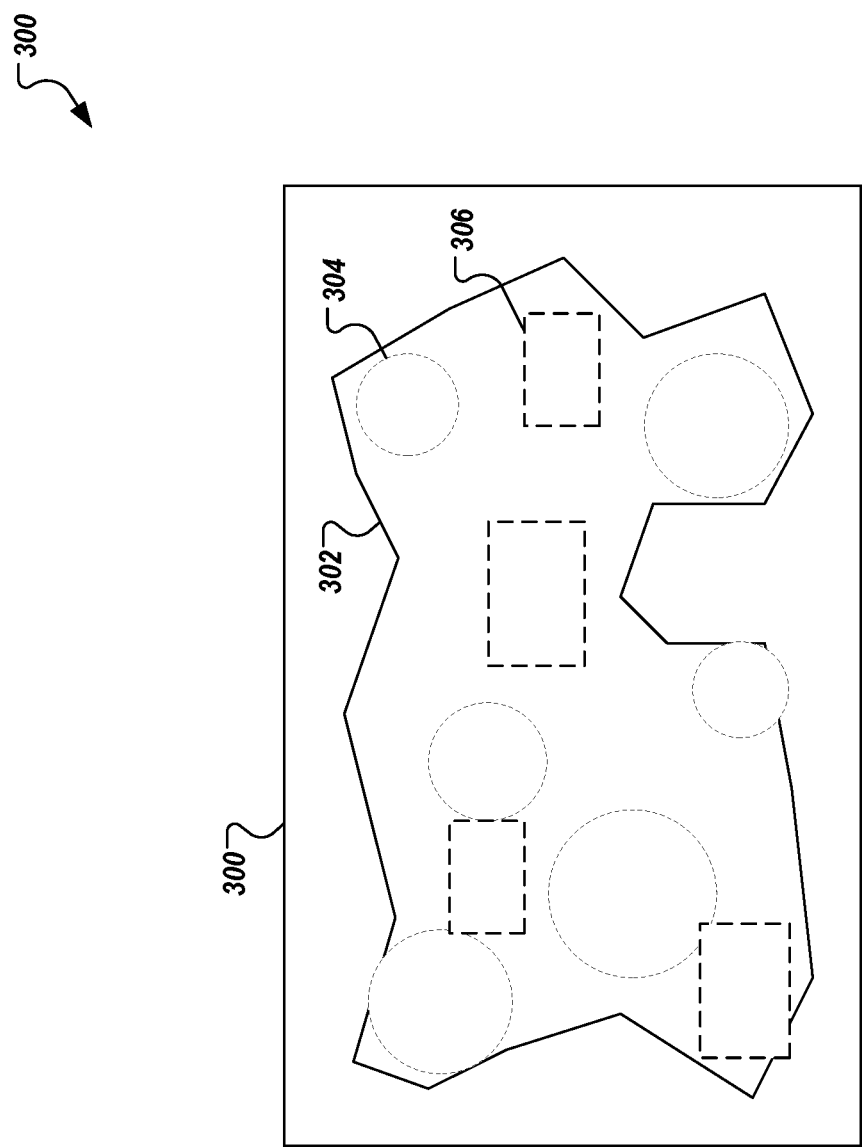
FIG. 3 depicts an example sample container including an example sample.

FIG. 3 depicts an example sample container 300 including an example sample 302. The example of FIG. 3 can include a digital image of the sample container 300 and sample 302 (e.g., displayed in a UI). In the depicted example, the sample 302 includes multiple objects identified within the sample 302. Each object is bounded by a boundary, each boundary being provided as a graphical overlay within the digital image. In the example of FIG. 3, two different types of objects are depicted, and are bounded by respective boundaries 304, 306. For example, a first type of object can include a contaminant that is bounded by boundaries 304, and a second type of object can include moisture that is bounded by boundaries 306.

In some implementations, an object count can be provided based on counting a number of instances of each type of object. In the example of FIG. 3, a first object count can be provided as six for the first type of object, and a second object count can be provided as four for the second type of object. In some implementations, a quantity of each type of object is provided. In some examples, the quantity is determined based on an area, and/or volume determined for the type of object. For example, a quantity within each boundary can be determined for each type of object, and the quantities can be summed to determine a total quantity for each type of object.

Figure 4:
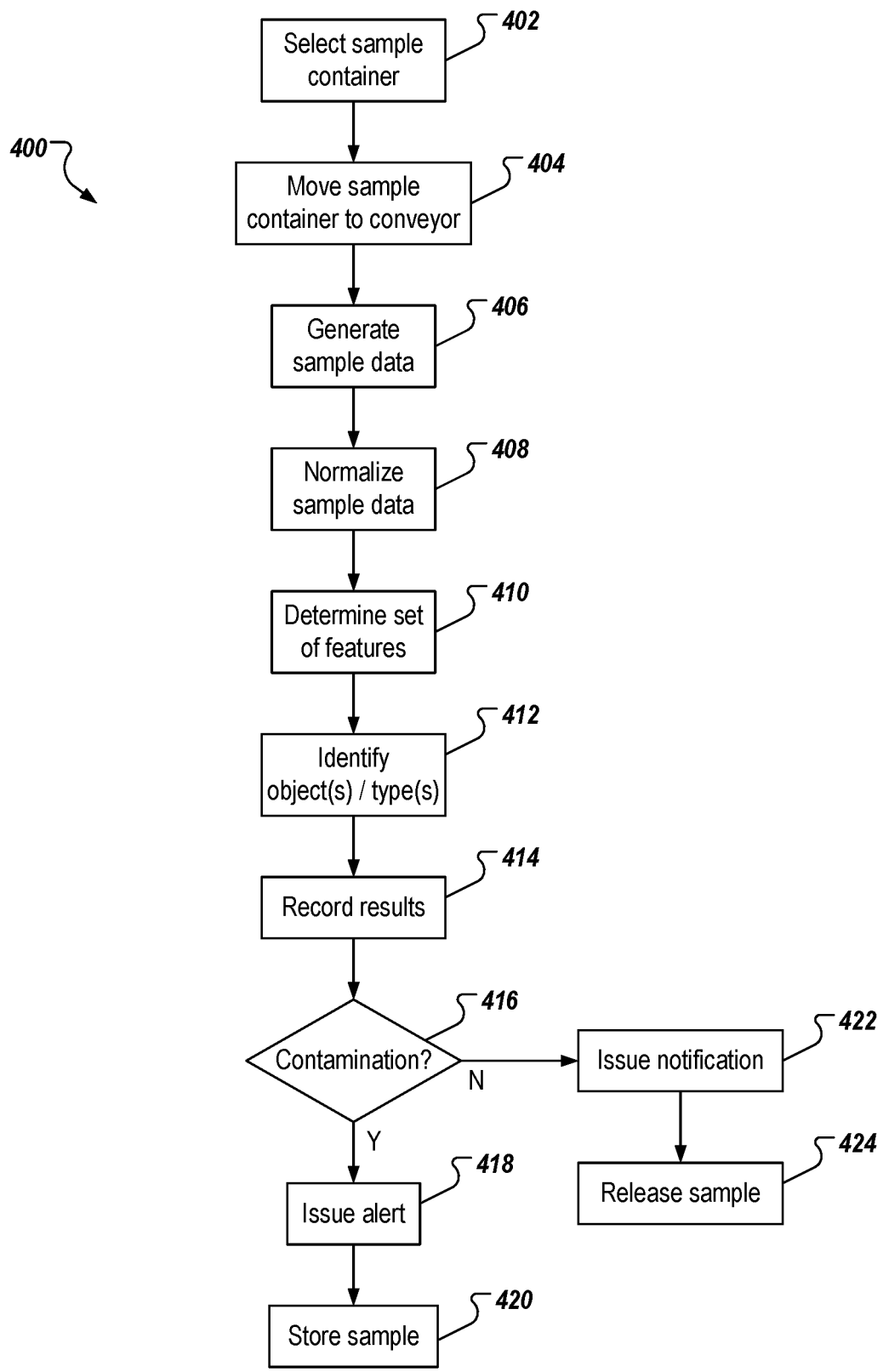
FIG. 4 depicts an example process that can be executed in implementations of the present disclosure.

FIG. 4 depicts an example process 400 that can be executed in implementations of the present disclosure. In some examples, the example process 400 is provided using one or more computer-executable programs executed by one or more computing devices (e.g., the back-end system 108 of FIG. 1).

A sample container is selected (402). For example, the robotic arm 124 can select a sample container 120 from a set of sample containers. In some examples, each sample container 120 includes a unique identifier (UID), which uniquely identifies the sample container 120, and/or a sample contained therein. In some examples, the sample container is selected based on the UID. For example, a machine-readable code (e.g., bar code, QR code) encodes the UID, and machine-readable codes of the sample containers 120 are read (e.g., by a code reader) to identify a subject sample container 120 that is to be analyzed. The robotic arm 124 grasps the sample container 120.

The sample container is moved to a conveyor (404). For example, the robotic arm 124 moves the sample container 120 from a location to the conveyor 122. In some examples, the robotic arm 124 places the sample container 120 in line behind other sample containers 120 on the conveyor 122. In some examples, the conveyor 122 conveys the sample containers 120 underneath the camera 126. Sample data is generated (406). For example, when the sample container 120 is positioned beneath the camera 126, the camera 126 generates sample data. In some examples, the sample data is provided as one or more digital images, and/or digital video. The sample data is normalized (408). In some examples, one or more image processing techniques are performed on the sample data to normalize the sample data.

A set of features is determined (410). For example, and as described in further detail herein, the sample data is processed through multiple layers of a resnet (e.g., Resnet-101), and progressively goes through the resnet backbone. At each layer of the resnet backbone, features within the sample data (e.g., digital image) are identified, and refined. One or more objects, and one or more types of objects are identified (412). For example, and as described in further detail herein, features of the set of features are processed through the CNN (e.g., R-CNN) in a multi-step process to provide a regional proposal, and classification. In some examples, the regional proposal includes a set of regions of interest (also referred to as a set of regions) determined through one or more layers of the CNN. In some examples, a region of interest includes an area of the sample that may contain an object. In some implementations, regions of the set of regions are resized, and one or more layers of the CNN (e.g., a final layer) predicts a type of the object present. In some implementations, for each object, a confidence score, and a boundary localizing the object within the sample are provided. In some examples, the confidence score represents a degree of confidence that the object is indeed of the type classified. In some examples, the boundary is provided as a visual overlay on a digital image of the sample, which encloses all of, or at least a portion of the object.

Results are recorded (414). In some examples, results can be recorded in one or more systems. An example system can include an ERP system. For example, the sample can be of a product distributed by an enterprise. The results can be recorded in an ERP system of the enterprise to track quality control analysis of particular products, and/or batches of products.

It is determined whether contamination is present (416). For examples, the results can be processed to determine whether contamination is present. In some examples, a single instance of a contaminant within the sample can indicate that contamination is present. In some examples, whether contamination is present can be determined based on a quantity of the contaminant. For example, if a quantity of the contaminant exceeds a threshold quantity, contamination is determined to be present. If a quantity of the contaminant does not exceed the threshold quantity, contamination is determined not to be present.

If contamination is present, an alert is issued (418), and the sample is stored (420). For example, an alert can be provided in a UI indicating the sample (e.g., UID), the contaminant, and/or the quantity of contaminant. In some examples, the sample (i.e., the sample container 120 containing the sample) is moved to a storage location (e.g., by the robotic arm 124) to be available for subsequent inspection. If not contamination is present, a notification is issued (422), and the sample is released (424).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for quality control based on one or more samples of a product, the method being executed by one or more processors, and comprising:
receiving, by the one or more processors, sample data, the sample data being generated as digital data representative of a sample of the product;
providing, by the one or more processors, a set of features by processing the sample data through multiple layers of a residual network, a first layer of the residual network identifying one or more features of the sample data, and a second layer of the residual network receiving the one or more features of the first layer, and identifying one or more additional features;
processing, by the one or more processors, the set of features to identify a set of regions of the sample of the product;
altering, by the one or more processors, a resolution of the digital data representation of the sample of the product based on the identified set of regions;
processing, by the one or more processors, the set of features to identify at least one object in a region of the set of regions, and determine a type of the at least one object; and
selectively issuing, by the one or more processors, an alert at least partially based on the type of the at least one object, the alert indicating contamination within the sample of the product.

2. The method of claim 1, wherein the residual network is Resnet-101.

3. The method of claim 1, wherein the set of features is processed using a convolution neural network (CNN).

4. The method of claim 3, wherein the CNN is a region-based CNN (R-CNN).

5. The method of claim 1, further comprising providing a visual depiction of the sample within a user interface, the visual depiction comprising one or more graphical overlays indicating objects identified in the sample.

6. The method of claim 1, further comprising moving, using a robotic arm, a sample container containing the sample to a position relative to a camera, the camera generating the sample data.

7. The method of claim 6, wherein the position is located on a conveyor, which conveys the sample container to the camera for imaging of the sample within the sample container.

8. The method of claim 1, wherein an output is provided and comprises a one-hot encoded vector representative of the at least one object within the sample, and a confidence level, the confidence score representing a degree of confidence that the at least one object is of the type classified.

9. The method of claim 1, wherein the sample data comprises one or more digital images of the sample.

10. The method of claim 1, wherein the set of features is processed to identify the volume of the region, and/or the area of the region, and/or the color of the region.

11. The method of claim 1, wherein the product comprises a biological material, and/or a pharmaceutical product, and/or a food product.

12. The method of claim 1, wherein the identified region comprises a moisture colony.

13. The method of claim 1, wherein the identified object comprises bacteria.

14. A non-transitory computer-readable storage medium coupled to one or more processors and having instructions stored thereon which, when executed by the one or more processors, cause the one or more processors to perform operations for quality control based on one or more samples of a product, the operations comprising:
receiving, by the one or more processors, sample data, the sample data being generated as digital data representative of a sample of the product;
providing, by the one or more processors, a set of features by processing the sample data through multiple layers of a residual network, a first layer of the residual network identifying one or more features of the sample data, and a second layer of the residual network receiving the one or more features of the first layer, and identifying one or more additional features;
processing, by the one or more processors, the set of features to identify a set of regions of the sample of the product;
altering, by the one or more processors, a resolution of the digital data representation of the sample of the product based on the identified set of regions;
processing, by the one or more processors, the set of features to identify at least one object in a region of the set of regions, and determine a type of the at least one object; and
selectively issuing, by the one or more processors, an alert at least partially based on the type of the at least one object, the alert indicating contamination within the sample of the product.

15. The computer-readable storage medium of claim 14, wherein the residual network is Resnet-101.

16. The computer-readable storage medium of claim 14, wherein the set of features is processed using a convolution neural network (CNN).

17. The computer-readable storage medium of claim 16, wherein the CNN is a region-based CNN (R-CNN).

18. The computer-readable storage medium of claim 14, wherein operations further comprise providing a visual depiction of the sample within a user interface, the visual depiction comprising one or more graphical overlays indicating objects identified in the sample.

19. The computer-readable storage medium of claim 14, wherein operations further comprise moving, using a robotic arm, a sample container containing the sample to a position relative to a camera, the camera generating the sample data.

20. The computer-readable storage medium of claim 14, wherein the position is located on a conveyor, which conveys the sample container to the camera for imaging of the sample within the sample container.

21. The computer-readable storage medium of claim 14, wherein an output is provided and comprises a one-hot encoded vector representative of the at least one object within the sample, and a confidence level, the confidence score representing a degree of confidence that the at least one object is of the type classified.

22. The computer-readable storage medium of claim 14, wherein the sample data comprises one or more digital images of the sample.

23. The computer-readable storage medium of claim 14, wherein the set of features is processed to identify the volume of the region, and/or the area of the region, and/or the color of the region.

24. The computer-readable storage medium of claim 14, wherein the product comprises a biological material, and/or a pharmaceutical product, and/or a food product.

25. The computer-readable storage medium of claim 14, wherein the identified region comprises a moisture colony.

26. The computer-readable storage medium of claim 14, wherein the identified object comprises bacteria.

27. A system, comprising:
one or more processors; and
a computer-readable storage device coupled to the one or more processors and having instructions stored thereon which, when executed by the one or more processors, cause the one or more processors to perform operations for quality control based on one or more samples of a product, the operations comprising:
receiving, by the one or more processors, sample data, the sample data being generated as digital data representative of a sample of the product;
providing, by the one or more processors, a set of features by processing the sample data through multiple layers of a residual network, a first layer of the residual network identifying one or more features of the sample data, and a second layer of the residual network receiving the one or more features of the first layer, and identifying one or more additional features;
processing, by the one or more processors, the set of features to identify a set of regions of the sample of the product;
altering, by the one or more processors, a resolution of the digital data representation of the sample of the product based on the identified set of regions;
processing, by the one or more processors, the set of features to identify at least one object in a region of the set of regions, and determine a type of the at least one object; and
selectively issuing, by the one or more processors, an alert at least partially based on the type of the at least one object, the alert indicating contamination within the sample of the product.

28. The system of claim 27, wherein the residual network is Resnet-101.

29. The system of claim 27, wherein the set of features is processed using a convolution neural network (CNN).

30. The system of claim 29, wherein the CNN is a region-based CNN (R-CNN).

31. The system of claim 27, wherein operations further comprise providing a visual depiction of the sample within a user interface, the visual depiction comprising one or more graphical overlays indicating objects identified in the sample.

32. The system of claim 27, wherein operations further comprise moving, using a robotic arm, a sample container containing the sample to a position relative to a camera, the camera generating the sample data.

33. The system of claim 32, wherein the position is located on a conveyor, which conveys the sample container to the camera for imaging of the sample within the sample container.

34. The system of claim 27, wherein an output is provided and comprises a one-hot encoded vector representative of the at least one object within the sample, and a confidence level, the confidence score representing a degree of confidence that the at least one object is of the type classified.

35. The system of claim 27, wherein the sample data comprises one or more digital images of the sample.

36. The system of claim 27, wherein the set of features is processed to identify the volume of the region, and/or the area of the region, and/or the color of the region.

37. The system of claim 27, wherein the product comprises a biological material, and/or a pharmaceutical product, and/or a food product.

38. The system of claim 27, wherein the identified region comprises a moisture colony.

39. The system of claim 27, wherein the identified object comprises bacteria.

* * * * *